United States Patent
Poole

(10) Patent No.: US 9,541,661 B2
(45) Date of Patent: *Jan. 10, 2017

(54) DEVICE AND METHOD FOR DEGHOSTING VARIABLE DEPTH STREAMER DATA

(71) Applicant: CGGVERITAS SERVICES SA, Massy (FR)

(72) Inventor: Gordon Poole, East Grinstead (GB)

(73) Assignee: CGG SERVICES SA, Massy (FR)

( * ) Notice: Subject to any disclaimer, the term of this patent is extended or adjusted under 35 U.S.C. 154(b) by 804 days.

This patent is subject to a terminal disclaimer.

(21) Appl. No.: 13/859,105

(22) Filed: Apr. 9, 2013

(65) Prior Publication Data

US 2013/0279290 A1 Oct. 24, 2013

Related U.S. Application Data

(60) Provisional application No. 61/635,489, filed on Apr. 19, 2012.

(51) Int. Cl.
  *G01V 1/38* (2006.01)
  *G01V 1/36* (2006.01)

(52) U.S. Cl.
  CPC .......... *G01V 1/38* (2013.01); *G01V 1/364* (2013.01); *G01V 2210/56* (2013.01)

(58) Field of Classification Search
  CPC ........ G01V 1/38; G01V 1/364; G01V 2210/56

(Continued)

(56) References Cited

U.S. PATENT DOCUMENTS 4,353,121 A 10/1982 Ray et al.
4,992,992 A 2/1991 Dragoset, Jr.

(Continued)

FOREIGN PATENT DOCUMENTS

WO 2011/154463 A1 12/2011

OTHER PUBLICATIONS

R. Soubaras et al., "Deghosting by Joint Deconvolution of a Migration and a Mirror Migration", SEG Denver 2010 Annual Meeting, Oct. 16-21, 2010, pp. 3406-3410, SEG.

(Continued)

Primary Examiner — Daniel L Murphy
(74) Attorney, Agent, or Firm — Patent Portfolio Builders PLLC

(57) ABSTRACT

Computing device, computer instructions and method for deghosting seismic data related to a subsurface of a body of water. The method may include receiving input seismic data recorded by seismic receivers that located at different depths ($z_r$), generating migration data (du) and mirror migration data (dd) from the input seismic data, deriving a ghost free model (m) based on simultaneously using the migration data (du) and mirror migration data (dd), generating primary (p) and ghost (g) datasets based on the ghost free model (m), simultaneously adaptively subtracting the primary (p) and ghost (g) datasets from the migration data (du) to provide adapted primary ($p'^1$ and $p'^2$) and adapted residual ($r'^1$ and $r'^2$) datasets and generating a final image (f) of the subsurface based on the adapted primary ($p'^1$ and $p'^2$) and the adapted residual ($r'^1$ and $r'^2$) datasets.

20 Claims, 7 Drawing Sheets

(58) Field of Classification Search
USPC .......................................................... 367/24
See application file for complete search history.

(56) References Cited

U.S. PATENT DOCUMENTS

| | | | |
|---|---|---|---|
| 8,243,547 | B2 | 8/2012 | Stewart et al. |
| 8,451,682 | B2 | 5/2013 | Soubaras |
| 8,456,695 | B2 | 6/2013 | Miyamura |
| 2007/0203673 | A1 | 8/2007 | Sherrill et al. |
| 2012/0092956 | A1 | 4/2012 | Soubaras |
| 2012/0213033 | A1 | 8/2012 | Soubaras |
| 2012/0218859 | A1 | 8/2012 | Soubaras |
| 2012/0241166 | A1 | 9/2012 | Sun |
| 2014/0362658 | A1* | 12/2014 | Poole ...................... G01V 1/36 367/7 |

OTHER PUBLICATIONS

R. Soubaras et al., "Variable-Depth Streamer Acquisition: Broadband Data for Imaging and Inversion", SEG San Antonio Annual Meeting, Sep. 18-23, 2011, pp. 2364-2368, SEG.

R. Soubaras et al., "Variable-Depth Streamer Acquisition: Broadband Data for Imaging and Inversion", Geophysics, Mar. 21, 2013, pp. WA27-WS39, vol. 78, Geophysics.

R. Soubaras et al., "Pre-Stack Deghosting for Variable-Depth Streamer Data", SEG Las Vegas 2012 Annual Meeting, Nov. 4-9, 2012, pp. 1-5, SEG.

British Search Report mailed Oct. 22, 2013, in related British Application No. GB 1307120.4.

International Search Report mailed Oct. 22, 2014, in related International Application No. PCT/EP2014/054065.

Written Opinion mailed Oct. 22, 2014, in related International Application No. PCT/EP2014/054065.

F. Gamar-Sadat et al.,"Velocity Model Building for Variable-Depth Streamer Data: Brunei Case Study," SEG Technical Program Expanded Abstracts, Aug. 19, 2013, pp. 4842-4846, XP055144734.

R. Soubaras, "Pre-Stack Deghosting for Variable-Depth Streamer Data," SEG Technical Program Expanded Abstracts, Sep. 1, 2012, pp. 1-5, XP055145406.

R. Soubaras et al., "Velocity Model Building by Semblance Maximization of Modulated-Shot Gathers," Geophysics, Sep.-Oct. 2007, pp. U67-U73, vol. 72, No. 5, XP001506284.

Yan Mei et al., "A Weighted Adaptive Subtraction for Two or More Multiple Models," SEG Denver 2010 Annual Meeting 3490, pp. 3488-3492.

Inventor's Disclosure dated May 28, 2015 pertaining to U.S. Appl. No. 13/859,105.

Office Action in related U.S. Appl. No. 14/050,161 dated Nov. 18, 2015.

* cited by examiner

US 9,541,661 B2

DEVICE AND METHOD FOR DEGHOSTING VARIABLE DEPTH STREAMER DATA

CROSS-REFERENCE TO RELATED APPLICATIONS

The present application claims the benefit of priority under 35 U.S.C. §119(e) to U.S. Provisional Application No. 61/635,489 filed on Apr. 19, 2012. The entire content of the above document is hereby incorporated by reference into the present application.

BACKGROUND

Technical Field

Embodiments of the subject matter disclosed herein generally relate to methods and systems and, more particularly, to mechanisms and techniques for deghosting seismic data collected with one or more streamers having variable depths.

Discussion of the Background

Recently, interest in developing new oil and gas production fields has dramatically increased. However, the availability of land based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill or not (to avoid a dry well).

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, improving the resolution of images of the structures under the seafloor is an ongoing process.

During a seismic gathering process, as shown in FIG. 1, a vessel 10 tows plural detectors 12. The plural detectors 12 are disposed along a cable 14. Cable 14 together with its corresponding detectors 12 are sometimes referred to, by those skilled in the art, as a streamer 16. The vessel 10 may tow plural streamers 16 at the same time. The streamers may be disposed horizontally, i.e., lying at a constant depth $z_1$ relative to the surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are distributed along a slanted straight line 14 that makes a constant angle α with a reference horizontal line 30.

With reference to FIG. 1, the vessel 10 may tow a sound source 20 configured to generate an acoustic wave 22a. The acoustic wave 22a propagates downward and penetrates the seafloor 24, eventually being reflected by a reflecting structure 26 (reflector R). The reflected acoustic wave 22b propagates upward and is detected by detector 12. For simplicity, FIG. 1 shows only two paths 22a corresponding to the acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water surface 18. Since the interface between the water and air is well approximated as a quasi perfect reflector (i.e., the water surface acts as a mirror for the acoustic waves), the reflected wave 22c is reflected back toward the detector 12 as shown by wave 22d in FIG. 1. Wave 22d is normally referred to as a ghost wave because this wave is due to a spurious reflection. The ghosts are also recorded by the detector 12, but with a reverse polarity and a time lag relative to the primary wave 22b. The degenerative effect that the ghost arrival has on seismic bandwidth and resolution is known. In essence, interference between primary and ghost arrivals causes notches, or gaps, in the frequency content recorded by the detectors.

The traces may be used to determine the subsurface (i.e., earth structure below surface 24) and to determine the position and presence of reflectors 26. However, the ghosts disturb the accuracy of the final image of the subsurface and, for at least this reason, various methods exist for removing the ghosts, i.e., deghosting, from the results of a seismic analysis.

U.S. Pat. Nos. 4,353,121 and 4,992,992, the entire contents of which are incorporated herein by reference, describe processing procedures that allow ghosts to be removed from recorded seismic data by using an acquisition device that includes a seismic streamer slanted at an angle (on the order of 2 degrees) to the surface of the water (slanted streamer).

The methods described in U.S. Pat. Nos. 4,353,121 and 4,992,992 are seismic processing procedures in one dimension and in two dimensions. Such procedures, however, cannot be generalized to three dimensions. This is so because a sampling interval of the sensors in the third dimension is given by the separation between the streamers, on the order of 150 m, which is much larger than the sampling interval of the sensors along the streamers, which is on the order of 12.5 m.

Thus, the above-discussed methods are not appropriate for seismic data collected with streamers having a curved profile as illustrated in FIG. 3. Such configuration has a streamer 52 with a curved profile defined by three parametric quantities, $z_0$, $s_0$ and $h_c$. It is noted that not the entire streamer has to have the curved profile. The first parameter $z_0$ indicates the depth of the first detector 54a relative to the surface 58 of the water. The second parameter $s_0$ is related to the slope of the initial part of the streamer 52 relative to a horizontal line 64. The example shown in FIG. 3 has the initial slope $s_0$ equal to substantially 3 percent. It is noted that the profile of the streamer 52 in FIG. 3 is not drawn to scale because a slope of 3 percent is a relatively small quantity. The third parameter $h_c$ indicates a horizontal length (distance along the X axis in FIG. 3 measured from the first detector 54a) of the curved portion of the streamer. This parameter may be in the range of hundreds to thousands of meters.

For such streamers, a deghosting process has been disclosed in U.S. patent application Ser. No. 13/272,428 (herein '428) authored by R Soubaras, the entire content of which is incorporated herein. According to '428, a method for deghosting uses joint deconvolution for migration and mirror migration images for generating a final image of a subsurface. The deghosting is performed at the end of the processing (during an imaging phase) and not at the beginning as with traditional methods. Further, '428 discloses that no datuming step is performed on the data. Despite the utility of the foregoing methods, a need exists for generating improved images of underwater geological structures.

SUMMARY

As detailed herein, a method for de-ghosting seismic data related to a subsurface of a body of water may include receiving input time-domain seismic data recorded by seismic receivers that are located at different depths ($z_r$), generating migration data (du) and mirror migration data (dd) from the seismic data, deriving a ghost free model (m) based on simultaneously using the migration data (du) and mirror migration data (dd), using the ghost free model to generate a deghosted dataset, and generating a final image (f) of the subsurface using the deghosted dataset. The migration data may be in the time or depth domain, with pre-stack dimension offset or angle, or the like.

Deriving the ghost free model may include solving an equation d=Lm for m, where L is a linear operator that incorporates a first ghost lag model ($\tau_{gu}$) corresponding to the migration data (du) and a second ghost lag model ($\tau_{gd}$) corresponding to the mirror migration data (dd), m is a ghost free model of the seismic data, and d contains data from the migration data (du) and the mirror migration data (dd). The model (m) may be in the parabolic Radon domain, the linear Radon domain, the FK domain, the hyperbolic Radon domain or the like.

A computing device that incorporates the method for de-ghosting seismic data is also described herein.

In addition to the foregoing, a method for processing seismic data related to a subsurface of a body of water includes receiving migration data (du) and mirror migration data (dd) generated from time-domain seismic data recorded by seismic receivers, deriving a first ghost lag model ($\tau_{gu}$) corresponding to the migration data (du) that estimates a first ghost lag to a seismic source as a function of an offset h of each seismic receiver, deriving a second ghost lag model ($\tau_{gd}$) corresponding to the mirrored migration data (dd) that estimates a second ghost lag to the seismic source as a function of an offset h of each seismic receiver and processing the migration data (du) using the first and second ghost lag models to provide a final image (f) of the subsurface.

As described herein, the above apparatus and methods may be used to generate improved images of underwater geological structures.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
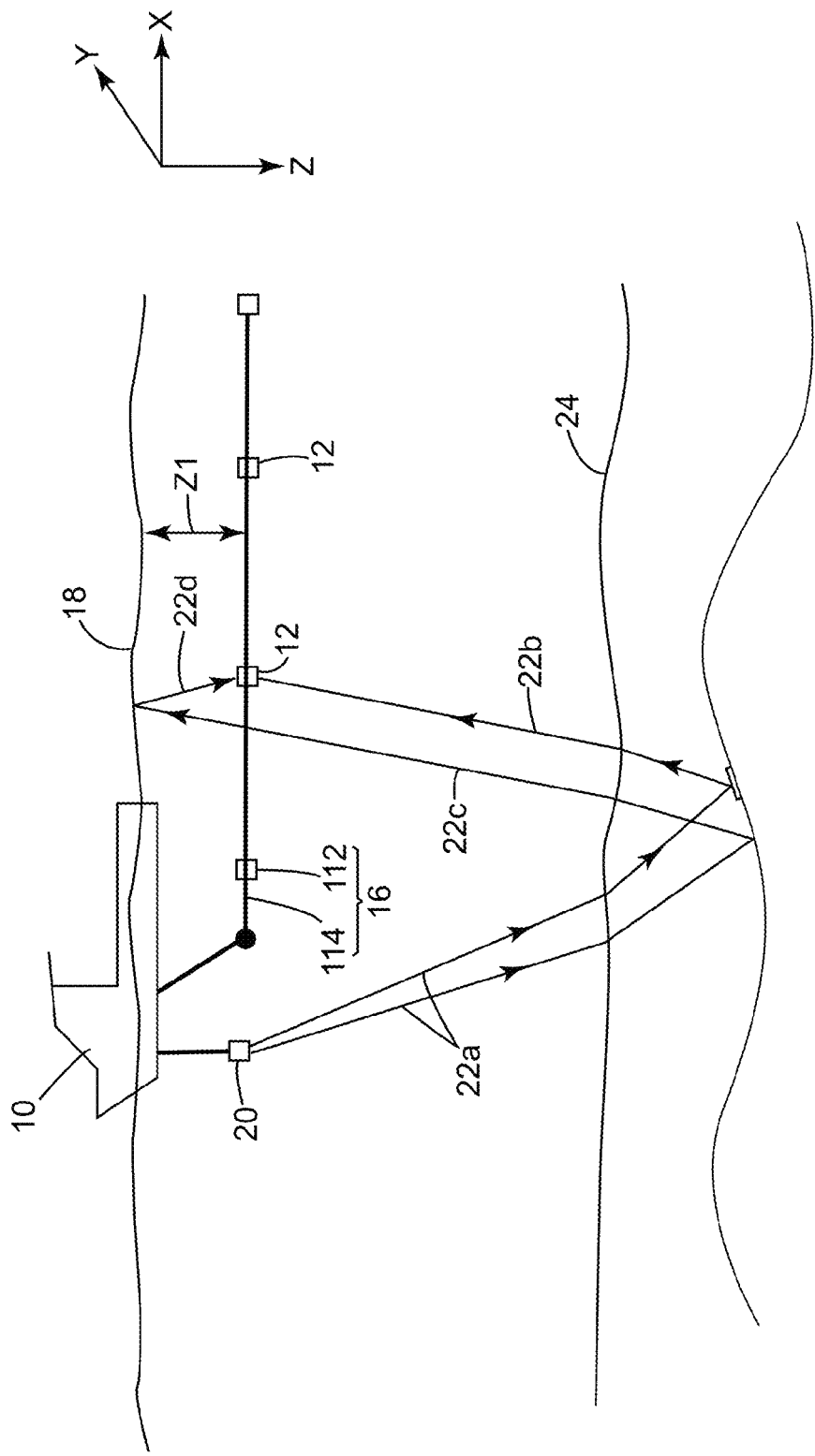
FIG. 1 is a schematic diagram of a conventional seismic data acquisition system having a horizontal streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a two-dimensional (2D) wave-field propagation. However, the embodiments to be discussed next are not limited to 2D wave-fields, but may be also applied to 3D wave-fields.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel method performs receiver deghosting by use of migrated common image gathers (migration and mirror migration). This is achieved by deriving a ghost free model of the data which when reverse transformed and re-ghosted simultaneously, matches gathers from the migration and mirror migration. Once the ghost free model has been derived, it is used to generate a primary and a ghost data estimate, which are simultaneously adaptively subtracted from the input data. The output data is the adapted primary plus any residual. The residual can be scaled to achieve de-noising if necessary. The method works in temporal windows. The ghost estimate may be generated with reference to the migration and/or mirror migration dataset. In the case that two ghost datasets are made, an adaptive subtraction may be applied to the migration using primary and migration ghost datasets, and independently to the mirror migration using primary and mirror migration ghost datasets. In this case two primary datasets have been found which may be combined by averaging.

The method is now discussed in more detail. An operator L links data d to a model m of deghosted data as noted in the equation d=Lm (1). More specifically, considering that d is a concatenation of migration data du and mirror migration data dd for a common image gather of nmax traces for one frequency slice, and m is the model domain containing kmax parabolic traces, equation (1) can be rewritten in matrix form as:

$$\begin{pmatrix} du_1 \\ du_2 \\ \vdots \\ du_{nmax} \\ - \\ dd_1 \\ dd_2 \\ \vdots \\ dd_{nmax} \end{pmatrix} = \begin{pmatrix} e^{2\pi i f \tau_{pr}[n,k]} & - & e^{2\pi i f (\tau_{pr}[n,k] + \tau_{gu}[n])} & - & - \\  & - &  & - & - \\  & - &  & - & - \\  & - &  & - & - \\ e^{2\pi i f \tau_{pr}[n,k]} & - & e^{2\pi i f (\tau_{pr}[n,k] + \tau_{gd}[n])} & - & - \\  & - &  & - & - \\  & - &  & - & - \end{pmatrix} \begin{pmatrix} m_1 \\ m_2 \\ \vdots \\ m_{kmax} \end{pmatrix} \quad (2)$$

The time-shift $\tau_{pr}[n, k]$ represents the lag associated with the primary events of the $n^{th}$ common image gather trace and $k^{th}$ model parameter while the time shift ($\tau_{pr}[n, k]+\tau_{gu}[n]$) or ($\tau_{pr}[n, k]+\tau_{gd}[n]$) represents the total lag associated with ghost reflections in the $n^{th}$ detector and $k^{th}$ model parameter in the migration data du and mirror migration dd respectively. Therefore d and L simultaneously provide a solution for the migration data (via the upper half of d and L) and mirror migration data (via the lower half of d and L).

The time shifts $\tau_{gu}[n]$ and $\tau_{gd}[n]$ may be defined by a first and a second ghost lag model that are derived from the migration data and mirror migration data respectively. The first ghost lag model ($\tau_{gu}$) and the second ghost lag model ($\tau_{gd}$) may estimate a ghost lag to the seismic source as a function of an offset h of each seismic receiver n. For example, in certain embodiments the ghost lag models are defined by a second order polynomial equation such as $\tau[n] = \tau_0 + p \cdot h[n] + q \cdot h[n]^2$ (3) where h[n] is the horizontal offset between the source and the nth common image gather trace (corresponding to the nth column of data) and where $\tau_0$, p and q are the zeroth, first (linear) and second (parabolic) order lag coefficients respectively.

According to an embodiment, the above equations are used to achieve a ghost-free model (m) at sea surface datum based on the parabolic wave propagation properties of the primary and ghost components. Deriving ghost lag models for both the migration data and mirror migration data and generating a ghost free model (m) may improve the deghosting process and provide a better final image (f) of the subsurface.

Assuming 3D migration algorithms have been used to generate the migration and mirror migration datasets, the algorithm is capable of correctly deghosting correctly according to 3D ghost propagation. For 2D datasets where only 2D migration is possible, the algorithm is still effective but 3D ghost propagation will not be optimally handled.

One or more of the embodiments discussed above may be implemented in a method for de-ghosting seismic data. According to one embodiment illustrated in FIG. 4, a method 400 for de-ghosting seismic data related to a subsurface of a body of water includes receiving (410) input seismic data, generating (420) migration data (du) and mirror migration data (dd), deriving (430) a ghost lag model for the migration and mirror migration data, deriving (440) a ghost free model (m) of the migration data, generating (450) primary (p), migration ghost ($g_m$) and mirror migration ghost ($g_{mm}$) dataset portions of the migration data, adaptively subtracting (460a) the primary (p) and migration ghost ($g_m$) datasets from the migration data (du) to obtain a first adapted primary ($p'^1$) datatset and a first adapted residual ($r'^1$) dataset, adaptively subtracting (460b) the primary (p) and mirror migration ghost ($g_{mm}$) datasets from the mirror migration data (dd) to obtain a second adapted primary dataset ($p'^2$) and a second adapted residual dataset ($r'^2$) and generating (470) a final image of the subsurface based on the adapted primary datasets ($p'^1$ and $p'^2$) and the adapted residual datasets ($r'^1$ and $r'^2$). The method 400 may be applied to a variety of streamer configurations such as those shown in FIGS. 1-3.

Figure 2:
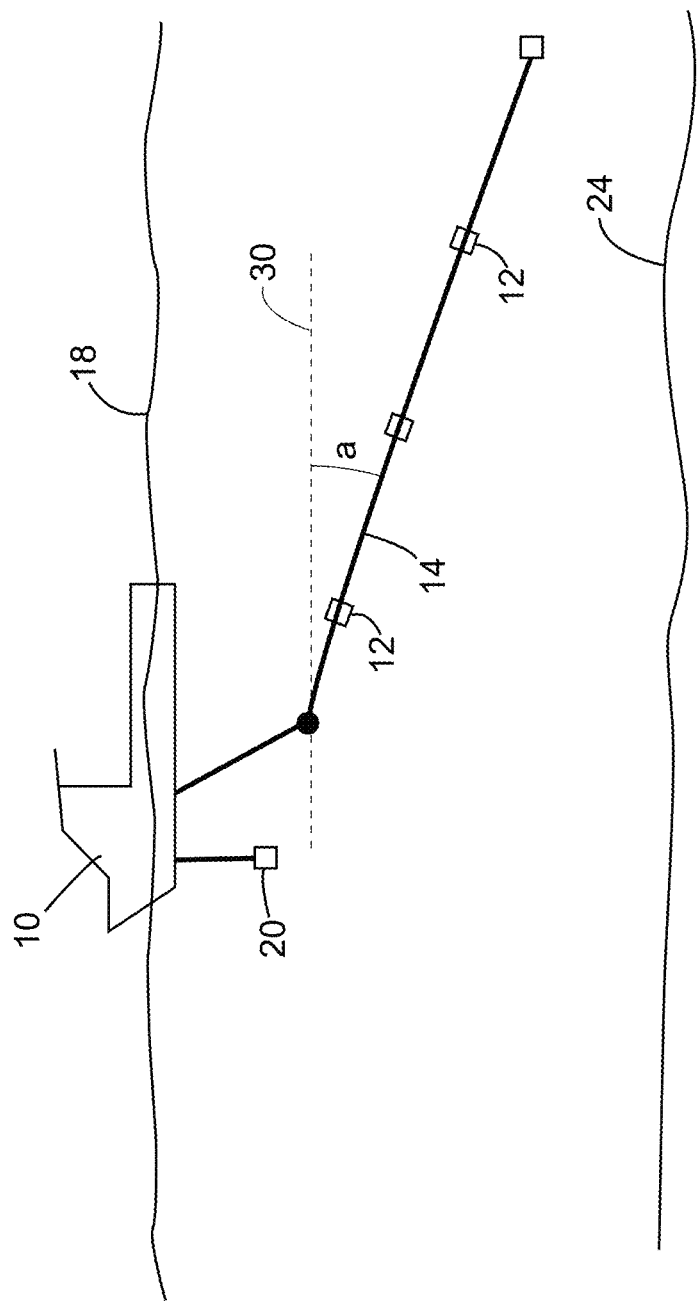
FIG. 2 is a schematic diagram of a seismic data acquisition system having a slanted streamer.
Figure 3:
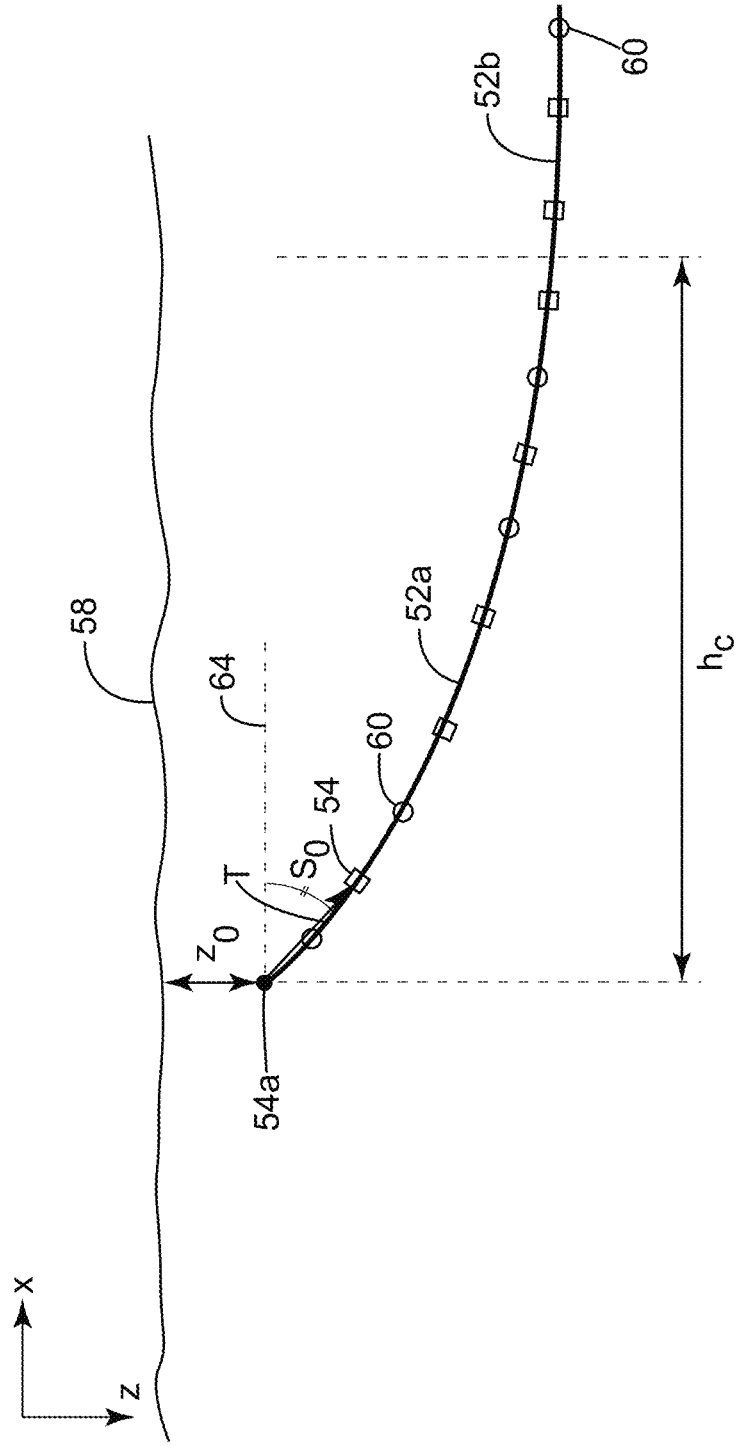
FIG. 3 is a schematic diagram of a seismic data acquisition system having a curved profile streamer.

Receiving (410) seismic data may include receiving input seismic data recorded by a set of seismic receivers that are towed by a vessel. The input seismic data may recorded in a time-space domain and the seismic receivers may be located at different depths ($z_r$) in the body of water. For example, the seismic receivers may be arranged in a sloped formation as shown in FIG. 2 or a curved formation as shown in FIG. 3.

Generating (420) migration data (du) and mirror migration data (dd) from the input seismic data may include executing a variety of migration algorithms. These may include, but are not limited to, Kirchhoff migration, Gaussian beam migration, or reverse time migration. Migrations that provide output in the depth or time domain may be used. The migrated data may be in offset, angle, or other pre-stack domain. The migration data (du) may correspond to an upward traveling wave reflected from the subsurface while the mirror migration data (dd) may correspond to a downward traveling wave reflected from the surface (i.e. the water/air interface).

Figure 6:
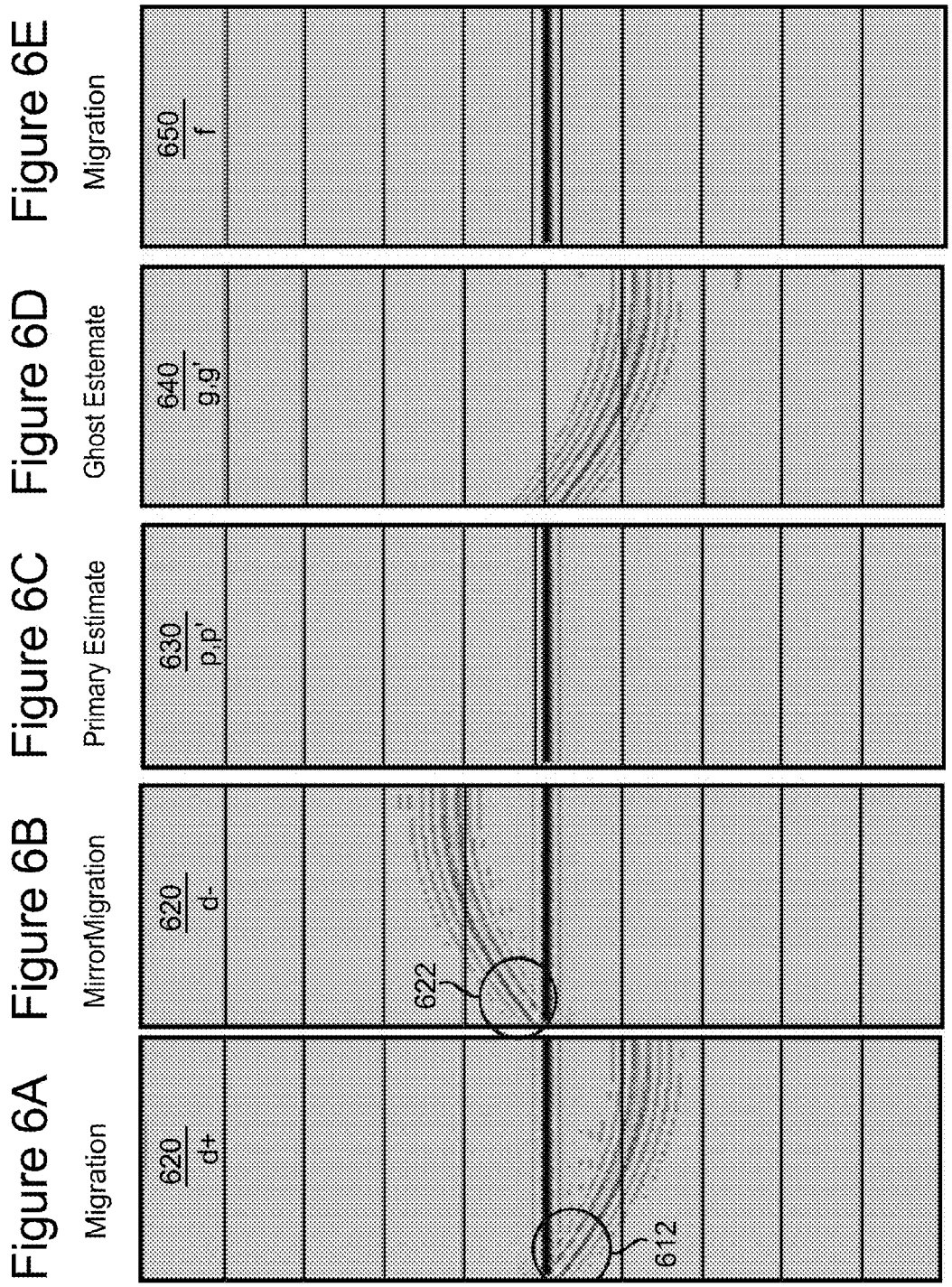
FIGS. 6A to 6E are graphs illustrating synthetic migration and mirror migration data processed according to the methods of FIGS. 4 and 5.

In certain embodiments, generating (420a) migration data (du) and generating (420b) mirror migration data (dd) includes executing a conventional migration operation on the input data from two (datum) perspectives. Firstly, the data is migrated using the actual cable datum, thus generating the migration dataset. Secondly, the data is migrated using a ghost cable position (i.e. using hypothetical receiver depths where the cable is assumed to be above the water surface) to generate the mirror migration dataset. For the migration data the primary event (induced by the source) of the upward waves are aligned and the ghost reflections are consequently misaligned. For mirror migration data, the ghost reflections present in the downward traveling wave are aligned and the primary events are consequently misaligned. The polarity of the mirror migration data may be reversed to undo the polarity reversal that occurs at the water/air interface. See FIGS. 6A and 6B for a synthesized example of migration data and mirror migration data.

Additional details and embodiments regarding the operation of generating (420) migration data (du) and mirror migration data (dd) may be found in commonly assigned U.S. patent application Ser. No. 13/464,109 (Pat. Pub. US 2012/0218859) and commonly assigned U.S. patent application Ser. No. 13/464,126 (Pat. Pub. US 2012/0213033) each of which is incorporated herein by reference.

Deriving (430) a ghost lag model for the migration and mirror migration data may include computing a slant stacked cross-correlation between the migration data (du) and the mirror migration data (dd) for a variety of slants and selecting the slant (i.e., first order ghost lag term) with the highest cross-correlation coefficient. Slant stacking may align the primary events in the mirror migration data with the primary events in the migration data for the traces that have an essentially linear lag (as a function of receiver distance) between the primary event and the ghost reflections. See linear regions 612 and 622 in FIGS. 6A and 6B for an example of regions of essentially linear lag.

Returning to FIG. 4, deriving (430a and 430b) may also include computing a curved stacked autocorrelation for the migration data (du) and the mirror migration data (dd) for a variety of curve shapes and selecting the curve shape (and the corresponding higher order ghost lag terms) with the highest auto-correlation coefficient. Curve stacking may help align the primary events with the ghost reflections (within either the migration data or the mirror migration data) particularly for traces that are not in the linear region of the migration and mirror migration data. See FIG. 5 and the associated description for additional details on deriving (430) the ghost lag models for the migration and mirror migration data. Higher order terms may be added as necessary to fully define the ghost lags. The migration and mirror migration ghost lags are non-stationary, and thus must be evaluated in different time windows.

Returning again to FIG. 4, deriving (440) a ghost free model (m) of the migration data may include converting the migration and mirror migration data to the frequency domain and solving for the ghost free model (m) that generates the migration and mirror migration frequency domain data (d) when multiplied by a linear operator L that incorporates a first ghost lag model ($\tau_{gu}$) corresponding to the migration data (du) and a second ghost lag model ($\tau_{gd}$) corresponding to the mirror migration data (dd).

The first and second ghost lag models ($\tau_{gu}$ and $\tau_{gd}$) may be incorporated into the linear operator L via a ghost reflection term $e^{2\pi i f(\tau_{pr}+\tau_g)}$ where or $\tau_g=\tau_{gu}$ or $\tau_{gd}$ according the form:

$$L = \begin{pmatrix} e^{2\pi i f \tau_{pr}[n,k]} & - & e^{2\pi i f(\tau_{pr}[n,k]+\tau_{gu}[n])} & - & - \\ & - & & - & - \\ & - & & - & - \\ e^{2\pi i f \tau_{pr}[n,k]} & - & e^{2\pi i f(\tau_{pr}[n,k]+\tau_{gd}[n])} & - & - \\ & - & & - & - \\ & - & & - & - \end{pmatrix} \quad (3)$$

which is also shown in equation (2) introduced above.

In one embodiment, the primary lag term is defined by the equation $\tau_{pr}[n,k]=k \cdot h[n]^2$ (4) where h[n]=the offset relating to the common image trace being constructed k is a second order lag coefficient that corresponds to $m_k$. In one embodiment the ghost lag terms $\tau_{gu}[n]$ and $\tau_{gd}[n]$ are defined by the equation $\tau_g[n]=\tau_0+p*h[n]+q*h[n]^2$ (5) where $\tau_0$, is the zero offset lag and p and q are the first and second order lag coefficients as defined by the ghost lag model. $\tau_{pr}[n,k]$ defines the reverse parabolic Radon travel times to transform the primary data reflectivity from model to data space (as per the equation in paragraph 24). The ghost models are a copy of this primary reflectivity with a time shift and a reverse in polarity. The time shift to make the migration ghost model is given by $\tau_{gu}$, and the time shift to make the mirror migration ghost model is given by $\tau_{gd}$. The time shifts $\tau_{gu}$ and $\tau_{gd}$ are defined by a parameteric model derived in the initial scanning phase of the algorithm in the form of a zero offset shift ($\tau_0$), linear term (p) and parabolic term (q). Although the above ghost lag terms (i.e., models) are defined by a second order polynomial equation, a second order polynomial equation is not required by the method 400 and any appropriate lag model may be used. For example, a third or fourth order ghost lag model may be fit to the migration and mirror migration data.

Image resolution may be improved by varying the ghost lag models with time (or depth in the case that depth migration has been used). This may be implemented with a time domain version algorithm which has ghost lags that vary as a function of time, or by processing the data in overlapping temporal windows. Each temporal window will have it's own ghost lag functions relating to the migration and mirror migration and will be modeled independently after a Fourier transform operation to the frequency domain.

One of skill in the art will appreciate that multiplying by the primary event and ghost reflection terms $e^{2\pi i f \tau_{pr}}$ and $e^{2\pi i f(\tau_{pr}+\tau_g)}$ within the matrix L effectively performs a series of phase shift operations on the frequency domain model m and that phase shifting in the frequency domain is equivalent to time shifting (i.e. applying a time lag) in the time domain. One of skill in the art will also appreciate that phase shifting in the frequency domain, which uses complex numbers, is not restricted to discrete phase shift values, while time shifting in the time domain, which uses real numbers, is typically restricted to discrete time shift values. Thus solving for the model m in the frequency domain, may result in a better model m and a better final image of a subsurface.

It should also be noted that any appropriate model domain such as a parabolic radon domain, a linear radon domain, a hyperbolic radon domain, and an f-k (frequency-wavenumber) domain may be used.

Having a ghost free model (m) that is derived using ghost lag models for both the migration data and the mirror migration data facilitates processing both the migration data and the mirror migration data. For example, subsequent to deriving 440 a ghost free model (m), the method 400 may continue by generating (450) primary (p) and ghost (g) dataset portions of the migration data. In one embodiment, the primary (p) and ghost (g) dataset portions (see FIGS. 6C and 6D for a synthesized example) are generated according to the matrix equations:

$$\begin{pmatrix} p_1 \\ p_2 \\ \vdots \\ p_{nmax} \end{pmatrix} = \begin{pmatrix} e^{2\pi i f \tau_{pr}[n,k]} & - & - & - \\ & - & - & - & - \\ & - & - & - & - \end{pmatrix} \begin{pmatrix} m_1 \\ m_2 \\ \vdots \\ m_{kmax} \end{pmatrix} \quad (6)$$

$$\begin{pmatrix} gu_1 \\ gu_2 \\ \vdots \\ gu_{nmax} \end{pmatrix} = \begin{pmatrix} -e^{2\pi i f(\tau_{pr}[n,k]+\tau_{gu}[n])} & - & - & - \\ & - & - & - & - \\ & - & - & - & - \end{pmatrix} \begin{pmatrix} m_1 \\ m_2 \\ \vdots \\ m_{kmax} \end{pmatrix} \quad (7)$$

Similarly, the ghost dataset portion of the mirror migration data may be generated using the matrix equation:

$$\begin{pmatrix} gd_1 \\ gd_2 \\ \vdots \\ gd_{nmax} \end{pmatrix} = \begin{pmatrix} -e^{2\pi i f(\tau_{pr}[n,k]+\tau_{gud}[n])} & - & - & - \\ & - & - & - & - \\ & - & - & - & - \end{pmatrix} \begin{pmatrix} m_1 \\ m_2 \\ \vdots \\ m_{kmax} \end{pmatrix} \quad (8)$$

Subsequent to generating primary (p) (via 450a) and ghost (g) (via 450b) dataset portions of the migration data, the method 400 may proceed by adaptively subtracting (460) the primary (p) and ghost (g) datasets from the migration data (du) to provide adapted primary (p') and adapted residual (r') datasets. The mirror migration data may be similarly processed. Adaptively subtracting (460) the primary (p) and ghost (g) datasets from the migration data (du) and generating (470) a final image (t) of the subsurface based on the adapted primary (p') and the adapted residual (r') datasets may improve the quality of the final image (f). Adaptive subtraction is a routine algorithm used in demultiple, for example, surface related multiple attenuation. For more information on adaptive subtraction see, for example, "Seismic multiple removal techniques past, present and future," D. J. Verschuur, page 45, which is incorporated herein by reference.

Figure 5:
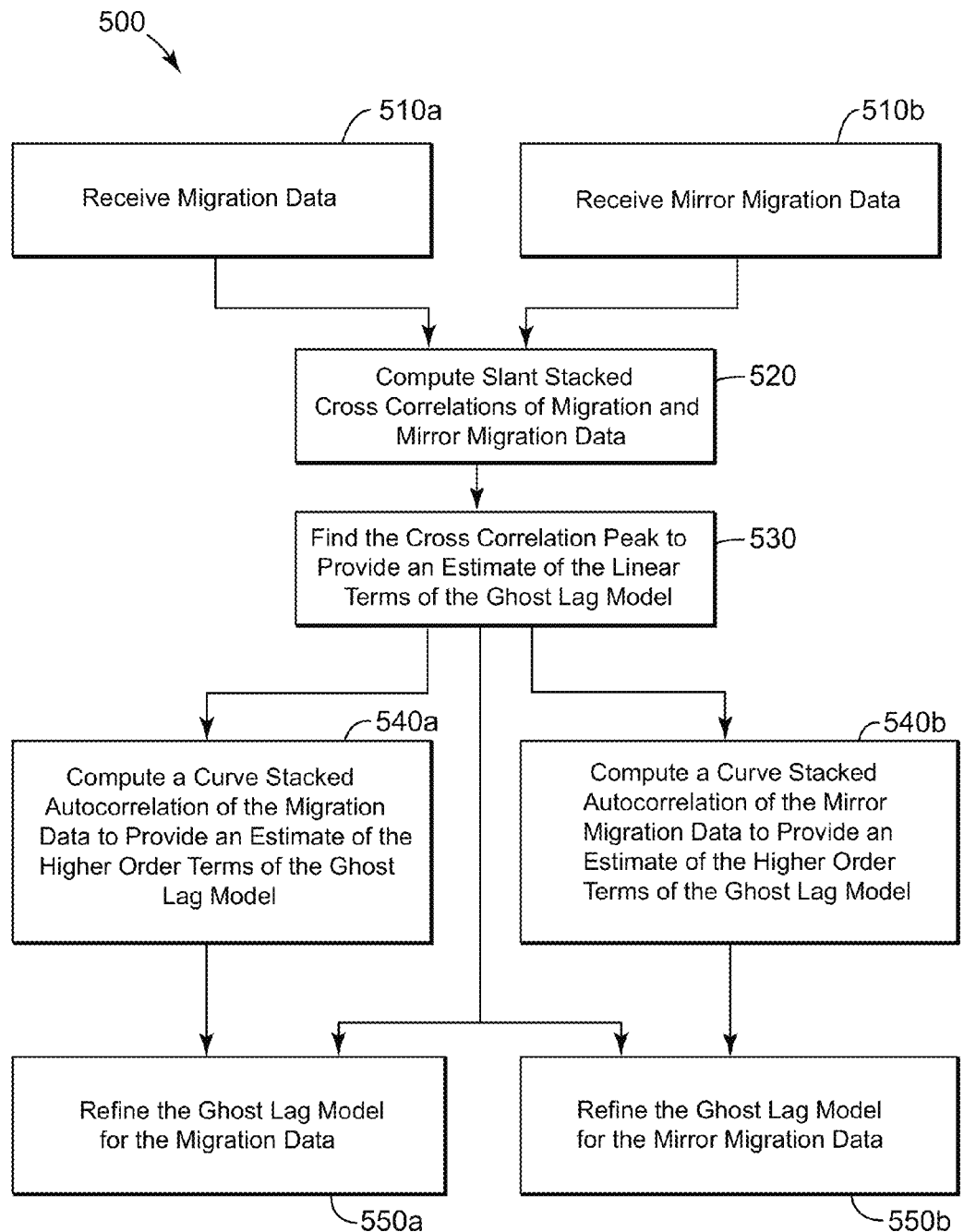
FIG. 5 is a flowchart of a method for ghost lag modeling of migration data and mirror migration data according to one embodiment.

FIG. 5 is a flowchart of a method 500 for generating a ghost lag model for migration data and mirror migration data. As depicted, the method 500 includes receiving (510) migration and mirror migration data, computing (520) slant stacked correlations of migration and mirror migration data, finding (530) a cross correlation peak, computing (540) a curved stacked autocorrelation of the migration and mirror migration data, and refining (550) the ghost lag model for the migration and mirror migration data. The ghost lag models for the migration data and the mirror migration data may be concurrently (or sequentially) generated by the method 500 and used in executing the method 400.

Receiving (510) may include receiving (510a) migration data (du) and receiving (510b) mirror migration data (dd) generated (420) from input seismic data recorded by a set of seismic receivers that are towed by a vessel. The input seismic data may be recorded in a time-space domain and the seismic receivers may be located at different depths ($z_r$) in the body of water.

Computing (520) slant stacked correlations of migration and mirror migration data may include correlating the migration data and the mirror migration data with various linear time shifts between the migration data and the mirror migration data. For example, in one embodiment the time shift between columns of the migration data and the mirror migration data conforms to a linear time shift equation such as $\tau[n]=\tau_0+p*h[n]$ (9) where h[n] is the horizontal offset between the source and the nth receiver (or nth column of data) and where $\tau_0$ and p are the zeroth and first order lag (or slowness) coefficients. The linear time shift equation may be restricted to columns of data corresponding to receivers that are close to the source. See the linear regions 612 and 622 in FIGS. 6A and 6B for an example of such columns of data.

Finding (530) a cross correlation peak may include determining the slant stacked correlation for various values of $\tau_0$ and p to determine the $\tau_0$ and p values which result in the peak slant stacked cross correlation value. In some embodiments, interpolation is used to improve the resolution of the peak finding process. Also the times may be spatially averaged or constrained in other ways to ensure stability.

Similarly, computing (540) a curve stacked autocorrelation of the migration and mirror migration data may include auto-correlating (via 540a) the migration data and auto-correlating (via 540b) the mirror migration data with various time shift curves between columns in the original data and columns the time-shifted copy of the original data. In certain embodiments, the time shift curves conform to a second order (i.e. curve stacked) equation such as $\tau[n]=\tau_0+p*h[n]+q*h[n]^2$ (10) where h[n] is the horizontal offset between the source and the nth receiver (or nth column of data) and where $\tau_0$, p and q are the zeroth, first (linear) and second (parabolic) order lag coefficients respectively. In one embodiment, the linear coefficients $\tau_0$ and p that are determined when finding (530) the cross correlation peak are used as initial $\tau_0$ and p values in equation (10) to find an initial value for q.

Subsequently, the method 500 may proceed by refining (550) the ghost lag model for the migration data (via 550a) and mirror migration data (via 550b). In one embodiment, refining (550) is accomplished by optimizing the coefficients of equation (10) according to a one or more conventional methods such as Gauss-Seidal, simulated annealing, Gauss-Newton or other optimization techniques. The initial values used in the optimization process may be provided from the results of steps 530 and 540.

In summary, the method 500 may be used to derive a first ghost lag model ($\tau_{gu}$) corresponding to the migration data (du) and a second ghost lag model ($\tau_{gd}$) corresponding to the mirrored migration data (dd). Furthermore, the method 500 may be used as the deriving operation 430 within the method 400 previous to processing (440-470) the migration data (du) (or the mirror migration data (dd)) using the first and second ghost lag models to provide an improved final image (t) of the subsurface.

Figure 4:
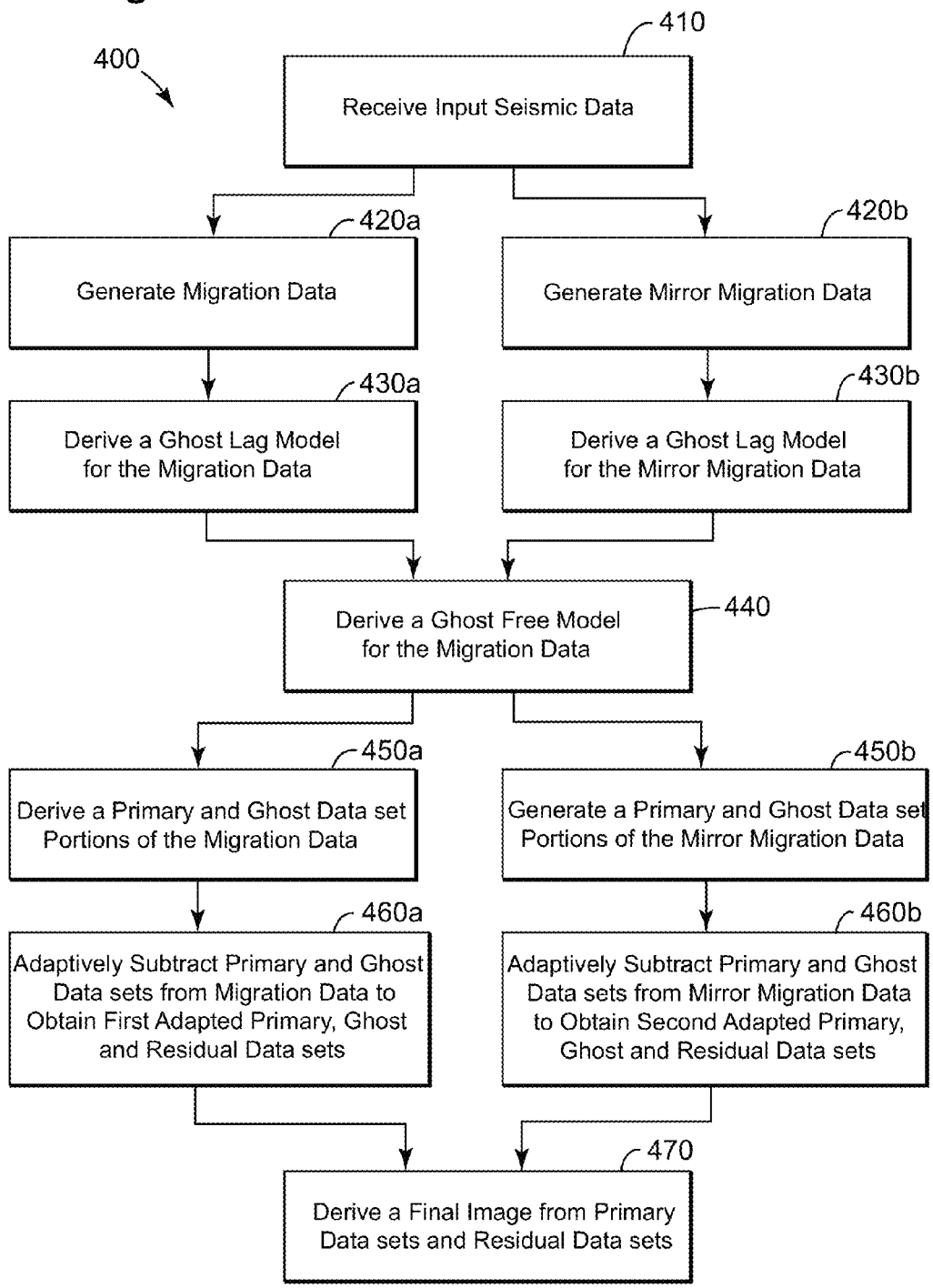
FIG. 4 is a flowchart of a method for deghosting seismic data according to one embodiment.

FIGS. 6A to 6E are time domain graphs illustrating synthetic migration and mirror migration data processed according to the methods of FIGS. 4 and 5. As depicted the processed synthetic data includes migration data 610 (or du), mirror migration data 620 (or dd), primary data or adapted primary data 630 (or p,p'), ghost reflection data or adapted ghost reflection data 640 (or g, g'), and a final image 650 (or t). Although the depicted data is synthetic, the principle of ghost removal from the migration data is clearly demonstrated.

Figure 7:
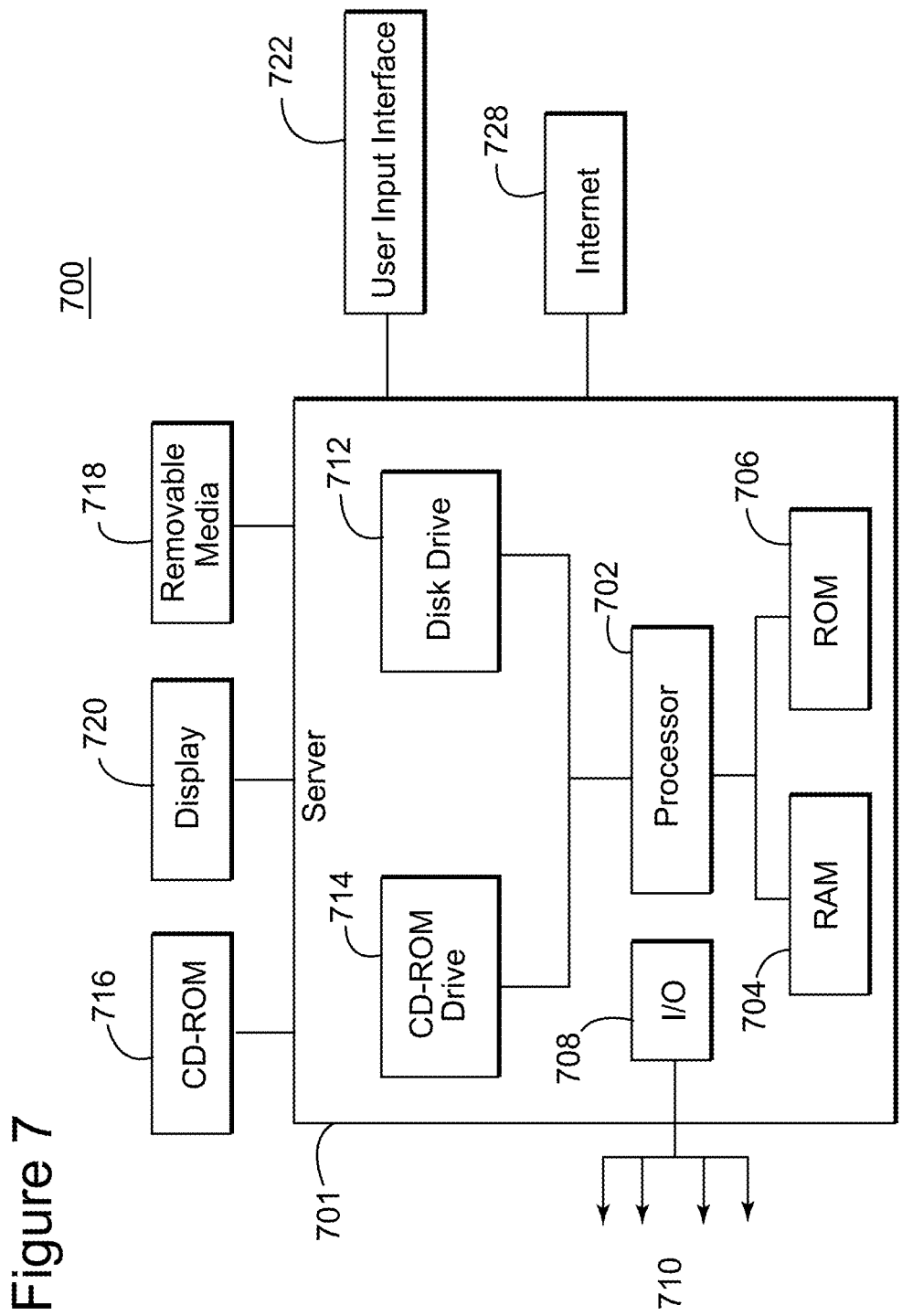
FIG. 7 is a schematic diagram of a computing device configured to implement a deghosting method according to an exemplary embodiment.

The above-discussed procedures and methods may be implemented in a computing device illustrated in FIG. 7. Hardware, firmware, software or a combination thereof may be used to perform the various steps and operations described herein. The computing device 700 of FIG. 7 is an exemplary computing structure that may be used in connection with such a system.

The exemplary computing device 700 suitable for performing the activities described in the exemplary embodiments may include a server 701. Such a server 701 may include a central processor (CPU) 702 coupled to a random access memory (RAM) 704 and to a read only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. The processor 702 carries out a variety of functions as are known in the art, as dictated by software and/or firmware instructions.

The server 701 may also include one or more data storage devices, including hard drives 712, CDDROM drives 714, and other hardware capable of reading and/or storing information such as DVD, etc. In one embodiment, software for carrying out the above-discussed steps may be stored and distributed on a CDDROM or DVD 716, a USB storage device 718 or other form of media capable of portably storing information. These storage media may be inserted into, and read by, devices such as the CDDROM drive 714, the disk drive 712, etc. The server 701 may be coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touchpad, touch screen, voice-recognition system, etc.

The server 701 may be coupled to other devices, such as sources, detectors, etc. The server may be part of a larger network configuration as in a global area network (GAN) such as the Internet 728, which allows ultimate connection to the various landline and/or mobile computing devices.

The disclosed exemplary embodiments provide a computing device and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for de-ghosting seismic data related to a subsurface of a body of water, the method comprising:
receiving input seismic data recorded by a plurality of seismic receivers, wherein the input seismic data is recorded in a time-space domain and the seismic receivers are located at different depths ($z_r$) in the body of water;
generating migration data (du) and mirror migration data (dd) from the seismic data;
deriving a ghost free model (m) based on simultaneously using the migration data (du) and mirror migration data (dd);
using the ghost free model to generate a deghosted dataset; and
generating a final image (f) of the subsurface using the deghosted dataset.

2. The method of claim 1, wherein the migration data is in the time domain or the depth domain.

3. The method of claim 1 where the migration data is in the offset domain or the angle domain.

4. The method of claim 1, wherein deriving the ghost free model comprises solving an equation d=Lm for m, where L is a linear operator that incorporates a reghosting operation, m is a ghost free model of the seismic data, and d contains data from the migration data (du) and the mirror migration data (dd).

5. The method of claim 4 where the reghosting operation uses a first ghost lag model ($\tau_{gu}$) corresponding to the migration data (du) and a second ghost lag model ($\tau_{gd}$) corresponding to the mirror migration data (dd).

6. The method of claim 5, further comprising deriving the first ghost lag model ($\tau_{gu}$) or the second ghost lag model ($\tau_{gd}$) by computing a cross-correlation between the migration data (du) and the mirror migration data (dd) and computing an autocorrelation for the migration data (du) or the mirror migration data (dd).

7. The method of claim 4, wherein L is defined such that the resulting model (m) is in a domain selected from the group including, but not limited to, the parabolic Radon domain, the linear Radon domain, the FK domain, and the hyperbolic Radon domain.

8. The method of claim 4, where the equation d=Lm is solved in the temporal frequency domain for a given time window.

9. The method of claim 4, wherein each element of the operator L comprises a primary event term $e^{2\pi i f \tau_{pr}}$ and a ghost reflection term $e^{2\pi i f (\tau_{pr}+\tau_g)}$ where $\tau_g$ is equal to the first or the second ghost lag models.

10. The method of claim 1, where the ghost free model (m) is used to calculate primary and ghost models for the migration and mirror migration datasets.

11. A computing device configured to de-ghost seismic data related to a subsurface of a body of water, the computing device comprising:
an interface configured to receive seismic data recorded by a plurality of seismic receivers that are towed by a vessel, wherein the seismic data is recorded in a time-space domain and the seismic receivers are located at different depths ($z_r$) in the body of water;
a processor configured to generate migration data (du) and mirror migration data (dd) from the seismic data;
the processor further configured to derive a ghost free model (m) based on simultaneously using the migration data (du) and mirror migration data (dd);
the processor further configured to generate a deghosted dataset based on the ghost free model (m); and
the processor further configured to use the deghosted dataset to generate a final image (f) of the subsurface.

12. The computing device of claim 11, wherein the processor is configured to derive the ghost free model by solving an equation d=Lm for m, where L is a linear operator that incorporates a reghosting operation, m is the ghost free model of the seismic data, and d contains data from the migration data (du) and the mirror migration data (dd).

13. The computing device of claim 12, wherein the processor is configured to derive a first ghost lag model ($\tau_{gu}$) or a second ghost lag model ($\tau_{gd}$) by computing a cross-correlation between the migration data (du) and the mirror migration data (dd) and computing an autocorrelation for the migration data (du) or the mirror migration data (dd).

14. The computing device of claim 12, wherein each element of the operator L comprises a primary event term $e^{-2\pi i f \tau_{pr}}$ and a ghost reflection term $e^{-2\pi i f (\tau_{pr}+\tau_g)}$ where $\tau_g$ is equal to the first or the second ghost lag models.

15. A method for processing seismic data related to a subsurface of a body of water, the method comprising:
receiving migration data (du) and mirror migration data (dd) generated from input seismic data recorded by a plurality of seismic receivers that are towed by a vessel, wherein the seismic data is recorded in a time-space domain and the seismic receivers are located at different depths ($z_r$) in the body of water;
deriving a first ghost lag model ($\tau_{gu}$) corresponding to the migration data (du) that estimates a first ghost lag to a seismic source as a function of an offset h of each seismic receiver of the plurality of seismic receivers;
deriving a second ghost lag model ($\tau_{gd}$) corresponding to the mirrored migration data (dd) that estimates a second ghost lag to the seismic source as a function of an offset h of each seismic receiver of the plurality of seismic receivers; and
processing the migration data (du) using the first and second ghost lag models to provide a final image (f) of the subsurface.

16. The method of claim 15, wherein deriving the first ghost lag model ($\tau_{gu}$) or the second ghost lag model ($\tau_{gd}$) comprises computing a cross-correlation between the migration data (du) and the mirror migration data (dd) and computing an autocorrelation for the migration data (du) or the mirror migration data (dd).

17. The method of claim 15, further comprising deriving a ghost free model (m) based on simultaneously using the migration data (du), the mirror migration data (dd), the first ghost lag model ($\tau_{gu}$) and the second ghost lag model ($\tau_{gd}$).

18. The method of claim 17, wherein deriving the ghost free model comprises solving an equation d=Lm for m, where L is a linear operator that incorporates the first ghost lag model ($\tau_{gu}$) and the second ghost lag model ($\tau_{gd}$), m is a ghost free model of the seismic data, and d is a frequency slice from the migration data (du) and the mirror migration data (dd).

19. The method of claim 18, wherein the ghost free model (m) corresponds to a second domain selected from the group including a parabolic radon domain, a linear radon domain, a hyperbolic radon domaim, and an f-k (frequency-wavenumber) domain.

20. The method of claim 18, wherein each element of the operator L comprises a primary event term $e^{-2\pi i f \tau_{pr}}$ and a ghost reflection term $e^{-2\pi i f(\tau_{p'}+\tau_g)}$ where $\tau_g$ is equal to the first or the second ghost lag models.

* * * * *